(12) United States Patent
Cao et al.

(10) Patent No.: US 12,081,167 B2
(45) Date of Patent: Sep. 3, 2024

(54) METHOD FOR LIMITING VOLTAGE OF MODULE, AND APPARATUS AND SYSTEM FOR APPLYING THE SAME

(71) Applicant: SUNGROW POWER SUPPLY CO., LTD., Anhui (CN)

(72) Inventors: Renxian Cao, Anhui (CN); Zongjun Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 219 days.

(21) Appl. No.: 16/652,252

(22) PCT Filed: May 13, 2019

(86) PCT No.: PCT/CN2019/086555
§ 371 (c)(1),
(2) Date: Aug. 20, 2020

(87) PCT Pub. No.: WO2020/164199
PCT Pub. Date: Aug. 20, 2020

(65) Prior Publication Data
US 2021/0367555 A1   Nov. 25, 2021

(30) Foreign Application Priority Data

Feb. 14, 2019 (CN) .......................... 201910114213.X

(51) Int. Cl.
*H02S 40/32* (2014.01)
*H02J 3/12* (2006.01)
*H02J 13/00* (2006.01)

(52) U.S. Cl.
CPC ................ *H02S 40/32* (2014.12); *H02J 3/12* (2013.01); *H02J 13/0001* (2020.01)

(58) Field of Classification Search
CPC ................................ H02J 3/12; H02J 13/0001
See application file for complete search history.

(56) References Cited

U.S. PATENT DOCUMENTS 10,411,477 B2 * 9/2019 Kaufman .................. H02J 3/46
10,819,117 B2 * 10/2020 Grana ............... H02J 13/00002
(Continued)

FOREIGN PATENT DOCUMENTS

CN       202111637 U    1/2012
CN       102931684 A    2/2013
(Continued)

OTHER PUBLICATIONS

CNIPA Second Office Action for corresponding CN Application No. 201910114213.X, Dated, Jun. 25, 2021.
(Continued)

*Primary Examiner* — Nathan L Laughlin
(74) *Attorney, Agent, or Firm* — CANTOR COLBURN LLP

(57) ABSTRACT

A method for component voltage limitation, and an apparatus and a system for applying the same. At least one photovoltaic cell in a photovoltaic-cell string is controlled to operate in a voltage-limited mode, in response to receiving an instruction for enabling voltage limitation. Thereby, the voltage of the photovoltaic-cell string is reduced. A quantity of photovoltaic modules connected in series can be increased, while a highest voltage of the system is guaranteed not to exceed a corresponding requirement. A system cost is reduced. The photovoltaic cell operating in the voltage-limited mode is controlled to resume a normal output, in response to receiving the instruction for suspending voltage limitation. The output voltage of the photovoltaic-cell string is increased. Thereby, a rate of utilization on a direct voltage, and a PVIR of DC/AC are improved for the photovoltaic system.

18 Claims, 10 Drawing Sheets

(56) References Cited

U.S. PATENT DOCUMENTS

| | | | |
|---|---|---|---|
| 2011/0203635 A1 | 8/2011 | Beck | |
| 2011/0298292 A1* | 12/2011 | Bremicker | H02J 3/381 |
| | | | 307/82 |
| 2015/0171628 A1 | 6/2015 | Ponec et al. | |
| 2016/0036380 A1* | 2/2016 | Johnston | H02S 50/10 |
| | | | 361/91.6 |
| 2016/0118934 A1 | 4/2016 | Johnson et al. | |
| 2017/0018931 A1 | 1/2017 | Kahn et al. | |
| 2018/0083450 A1 | 3/2018 | Truong et al. | |
| 2019/0013420 A1 | 1/2019 | Nesemann et al. | |
| 2020/0067452 A1 | 2/2020 | Yang et al. | |
| 2021/0313808 A1* | 10/2021 | Zhang | H02J 3/381 |

FOREIGN PATENT DOCUMENTS

| | | |
|---|---|---|
| CN | 105356511 A | 2/2016 |
| CN | 105723614 A | 6/2016 |
| CN | 105743432 A | 7/2016 |
| CN | 206595720 U | 10/2017 |
| CN | 107872196 A | 4/2018 |
| CN | 108781055 A | 11/2018 |
| CN | 109067353 A | 12/2018 |
| CN | 105743432 B | 4/2019 |
| DE | 102016118039 A1 | 3/2018 |
| WO | 2018054835 A1 | 3/2018 |

OTHER PUBLICATIONS

International Search Report for International Application PCT/CN2019/086555, mailing date Oct. 30, 2019.
Canadian Second Examiner's Report for corresponding CN Application No. 2019086555; Issued on Aug. 31, 2022.
EPO Extended European Search Report for corresponding EP Application No. 19861251.7; Issued on Jan. 10, 2023.
CNIPA Fourth Office Action for corresponding CN Application No. 201910114213.X; Issued on Mar. 30, 2022.
CNPA 1st Office Action for corresponding CN Application No. 201910114213.X; Dated, Jan. 5, 2021.

* cited by examiner

METHOD FOR LIMITING VOLTAGE OF MODULE, AND APPARATUS AND SYSTEM FOR APPLYING THE SAME

CROSS REFERENCE TO RELATED APPLICATION

This application is the US national phase of International Application No. PCT/CN2019/086555, titled "METHOD FOR LIMITING VOLTAGE OF MODULE, AND APPARATUS AND SYSTEM FOR APPLYING THE SAME", filed on May 13, 2019, which claims priority to Chinese Patent Application No. 201910114213.X, titled "METHOD FOR LIMITING VOLTAGE OF MODULE, AND APPARATUS AND SYSTEM FOR APPLYING THE SAME", filed on Feb. 14, 2019 with China National Intellectual Property Administration, which is incorporated herein by reference in its entirety.

FIELD

The present disclosure relates to the technical field of power electronics, and particularly, to a method for component voltage limitation, an apparatus for applying the method, and a system for applying the method.

BACKGROUND

A photovoltaic power generation system mainly includes a photovoltaic module and an inverter. Multiple photovoltaic modules are connected in series and in parallel, and send a direct voltage into the inverter. The direct voltage is converted into an alternate voltage by the inverter, and the alternate voltage is supplied to a grid or a load.

As a power level of the inverter increases, more photovoltaic modules are connected into a system, and a cost of the system is reduced. A maximum voltage of the system is required to be no higher than 1500V for series connection of multiple photovoltaic modules. Thereby, a quantity of photovoltaic modules in the series connection is limited.

An output power of a photovoltaic module keeps changing with a voltage. As shown in FIG. 1, an output voltage Vmpp corresponding to a maximum power point is usually about 80% of an open circuit voltage Voc. Taking a system of 1500V as an example, a voltage at a direct-current side of the inverter gradually reaches and keeps 1200V in operation. Therefore in practice, an effective rate of utilization for the direct voltage of the system, and a PV-to-inverter ratio of DC/AC are both low for the photovoltaic module and the inverter.

SUMMARY

In view of the above, a method for component voltage limitation, and an application apparatus and a system for applying the same are provided according to embodiments of the present disclosure. An objective is to address an issue that a quantity of components in series connection is limited and rate of utilization on a direct voltage of a system is low in conventional technology.

To achieve the above objective, following technical solutions are provided according to embodiments of the present disclosure.

In a first aspect of the present disclosure, a method for component voltage limitation is provided, including:
 receiving an instruction for enabling voltage limitation or an instruction for suspending voltage limitation;
 controlling at least one photovoltaic cell in a photovoltaic-cell string to operate in a voltage-limited mode, in response to receiving the instruction for enabling voltage limitation, where the photovoltaic-cell string includes multiple photovoltaic cells connected in series, and each of the multiple photovoltaic cells is a photovoltaic-cell sheet, a photovoltaic sub-string, or a photovoltaic module; and
 controlling a photovoltaic cell operating in the voltage-limited mode to resume a normal output, in response to receiving the instruction for suspending voltage limitation.

Preferably, the voltage-limited mode includes: a complete-short mode in which an output voltage is zero, or a chopping mode in which an output voltage is controlled based on pulse width modulation (PWM).

Preferably, before receiving the instruction for enabling voltage limitation or the instruction for suspending voltage limitation, the method further includes:
 detecting and uploading a parameter of the photovoltaic-cell string, where the parameter of the photovoltaic-cell string is a voltage or a current of a controlled photovoltaic cell.

According to a second aspect of the present disclosure, another method for component voltage limitation is further provided, including:
 detecting or receiving a parameter of a photovoltaic-cell string, where the photovoltaic-cell string includes multiple photovoltaic cells connected in series, and each of the multiple photovoltaic cells is a photovoltaic-cell sheet, a photovoltaic sub-string or a photovoltaic module;
 determining, based on the parameter of the photovoltaic-cell string, whether the parameter of the photovoltaic-cell string satisfies a condition for enabling voltage limitation or a condition for suspending voltage limitation;
 outputting an instruction for enabling voltage limitation, to control at least one photovoltaic cell in the photovoltaic-cell string to operate in a voltage-limited mode, in response to the parameter of the photovoltaic-cell string satisfying the condition for enabling voltage limitation; and
 outputting the instruction for suspending voltage limitation, to control a photovoltaic cell operating in the voltage-limited mode to resume a normal output, in response to the parameter of the photovoltaic-cell string satisfying the condition for suspending voltage limitation.

Preferably, the voltage-limited mode includes: a complete-short mode in which an output voltage is zero, or a chopping mode in which an output voltage is controlled based on pulse width modulation (PWM).

Preferably, the detected parameter of the photovoltaic-cell string is a voltage or a current of the photovoltaic-cell string; or
 the received parameter of the photovoltaic-cell string is a voltage or a current of a controlled photovoltaic cell.

Preferably, the condition for enabling voltage limitation is a condition characterizing that a direct voltage of a system is higher than an upper limit; and
 the condition for suspending voltage limitation is a condition characterizing that the direct voltage of the system is lower than a lower limit.

Preferably, in a case that the detected parameter of the photovoltaic-cell string is the voltage of the photovoltaic-cell string, the condition characterizing that the direct voltage of the system is higher than the upper limit is that the voltage of the photovoltaic-cell string is greater than a first preset voltage, and the condition characterizing that the direct voltage of the system is lower than the lower limit is that the voltage of the photovoltaic-cell string is less than a second preset voltage, where the first preset voltage is greater than the second preset voltage; and in a case that the detected parameter of the photovoltaic-cell string is the current of the photovoltaic-cell string, the condition characterizing that the direct voltage of the system is higher than the upper limit value is that the current of the photovoltaic-cell string is less than a first preset current; and the condition characterizing that the direct voltage of the system is lower than the lower limit is that the current of the photovoltaic-cell string is greater than a second preset current, where the first preset current is less than the second preset current.

According to another aspect of the present disclosure, a circuit for component voltage limitation is further provided, including: a communication module, a control unit, a switch unit, and a power module, where:

the control unit is configured to perform the method for component voltage limitation according to the first aspect of the present disclosure;
the communication module is for communication between the control unit and outside;
the switch unit is connected in parallel with a photovoltaic cell controlled by the control unit, and the switch unit is controlled by the control unit, to make the photovoltaic cell operate in the voltage-limited mode or resume the normal output; and
the power module is configured to power the communication module and the control unit.

According to another aspect of the present disclosure, an intelligent apparatus for voltage limitation is also provided, including the aforementioned circuit for component voltage limitation, where the photovoltaic cell connected to the circuit for component voltage limitation is the photovoltaic module.

According to another aspect of the present disclosure, an intelligent junction box for voltage limitation is further provided, including: multiple diodes, and the aforementioned circuit for component voltage limitation, where:

the photovoltaic cell connected to the circuit for component voltage limitation is a photovoltaic sub-string; and
each of the multiple diodes is connected in anti-parallel with a corresponding one of the photovoltaic sub-string.

According to another aspect of the present disclosure, an intelligent component is further provided, including: a photovoltaic module, and the aforementioned intelligent junction box for voltage limitation.

According to another aspect of the present disclosure, a controller is further provided, including a processor and a memory, where:

the processor is configured to execute a program stored in the memory; and
the program stored in the memory includes the method for component voltage limitation according to the second aspect of the present disclosure.

According to another aspect of the present disclosure, an inverter is further provided, where a program executed by a controller of the inverter includes the any method for component voltage limitation according to the second aspect of the present disclosure.

Preferably, the inverter further includes: a communication host, configured to communicate with outside.

According to another aspect of the present disclosure, a photovoltaic power generation system is also provided, including:

the aforementioned inverter;
at least one photovoltaic string connected to a direct-current side of the inverter, where the at least one photovoltaic string includes multiple photovoltaic modules connected in series, and each of the at least one photovoltaic string is connected with at least one aforementioned intelligent apparatus for voltage limitation; and
a communication host, configured to communicate with the at least one intelligent apparatus for voltage limitation.

Preferably, the communication host is integrated inside the inverter.

According to another aspect of the present disclosure, a photovoltaic power generation system is provided, including: the aforementioned inverter, at least one photovoltaic string connected to a direct-current side of the inverter, and a communication host, where:

the at least one photovoltaic string includes multiple intelligent components connected in series;
each of the multiple intelligent components is the aforementioned intelligent component; and
the communication host is configured to communicate with the plurality of intelligent components.

Preferably, the communication host is integrated inside the inverter.

The method for component voltage limitation provided according to an embodiment of the present disclosure. The at least one photovoltaic cell in the photovoltaic-cell string is controlled to operate in the voltage-limited mode, in response to receiving the instruction for enabling voltage limitation. Thereby, a voltage of the photovoltaic-cell string is reduced. A quantity of photovoltaic modules connected in series can be increased while the highest voltage of the system is guaranteed not to exceed a corresponding requirement, and a cost of the system is reduced. The photovoltaic cell operating in the voltage-limited mode is controlled to resume the normal output, and the output voltage of the photovoltaic-cell string is increased, in response to receiving the instruction for suspending voltage limitation. Thereby, the rate of utilization on the direct voltage and the PV-to-inverter ratio of DC/AC are improved for the photovoltaic system.

DETAILED DESCRIPTION

For better understanding of the present disclosure, hereinafter preferable implementations of the present disclosure are described in conjunction with embodiments. It should be appreciated that following description is merely intended to further describe the present disclosure, instead of limiting claims of the present disclosure.

A method for component voltage limitation is provided according to a first embodiment of the present disclosure, so as to address an issue that a quantity of components in series connection is limited and rate of utilization on a direct voltage of a system is low in conventional technology.

Figure 1:
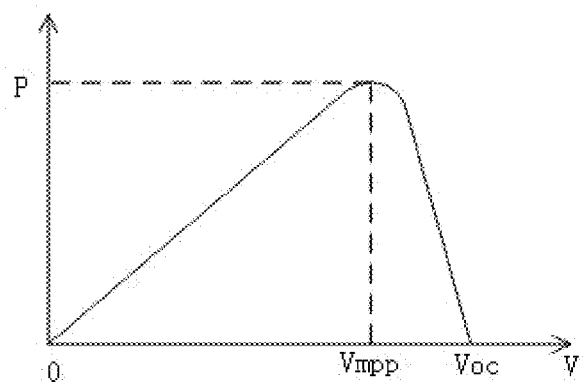
FIG. 1 is a graph of an output characteristic curve of a photovoltaic module in conventional technology.
Figure 2:
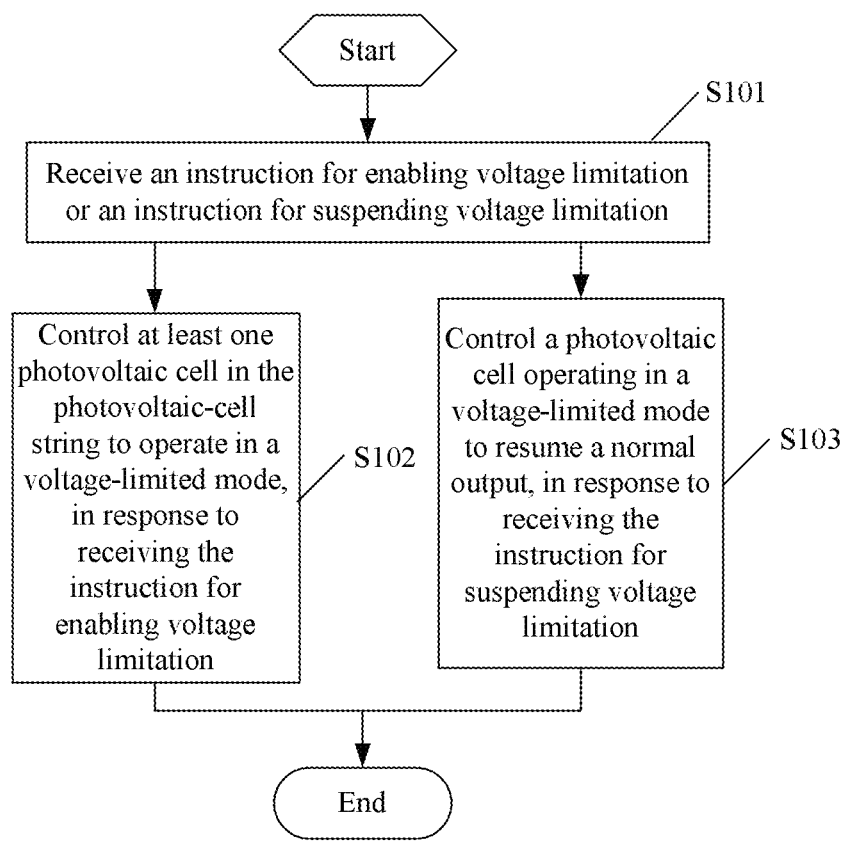
FIG. 2 is a flow chart of a method for component voltage limitation according to an embodiment of the present disclosure.

Referring to FIG. 2, the method for component voltage limitation includes steps S101 to S103.

In S101, an instruction for enabling voltage limitation or an instruction for suspending voltage limitation is received.

In a photovoltaic power generation system, a high output voltage of a photovoltaic string results in that a direct voltage of the system exceeds an upper limit. As an example, the instruction for enabling voltage limitation may be used for voltage-limiting control before an inverter is connected to a grid. The instruction for suspending voltage limitation may be used for voltage-increasing control in a case that the direct voltage of the system is lower than a lower limit. For example, the direct voltage of the system decreases due to MPPT (Maximum Power Point Tracking) control after the inverter is connected to the grid.

The method goes to step S102 in a case that the instruction for enabling voltage limitation is received in the step S101. The method goes to step S103 in a case that the instruction for suspending voltage limitation is received in the step S101.

In S102, at least one photovoltaic cell in a photovoltaic-cell string is controlled to operate in a voltage-limited mode.

The photovoltaic-cell string includes multiple photovoltaic cells connected in series. The photovoltaic cell may be a photovoltaic-cell sheet, a photovoltaic sub-string or a photovoltaic module. A type is determined based on an application environment, and all fall within the protection scope of the present disclosure. Generally, the photovoltaic-cell sheet refers to a smallest unit for generating photovoltaic power, and a single photovoltaic-cell sheet may output a voltage ranging from 0.3V to 0.7V. Multiple photovoltaic-cell sheets, such as 10, 12 or 20 photovoltaic-cell sheets, are connected in series via a bus-bar to form a photovoltaic sub-string. Multiple photovoltaic sub-strings are further connected in series to form a photovoltaic module. A conventional photovoltaic module may include 60 sheets, 72 sheets, or multiple half-sheets. In a case that the photovoltaic cell refers to the photovoltaic-cell sheet or the photovoltaic sub-string, the method for component voltage limitation is applied inside a photovoltaic module. In a case that the photovoltaic cell refers to the photovoltaic module, the method for component voltage limitation is applied to an entire photovoltaic string.

Specifically, the voltage-limited mode includes a complete-short mode or a chopping mode. In the complete-short mode, an output voltage is zero. In the chopping mode, an output voltage is controlled based on PWM (pulse width modulation).

Figure 3A:
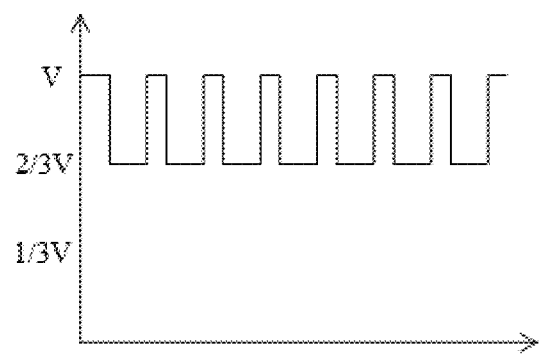
FIGS. 3A and 3B are schematic waveform diagrams of a chopping mode according to an embodiment of the present disclosure.
Figure 3B:
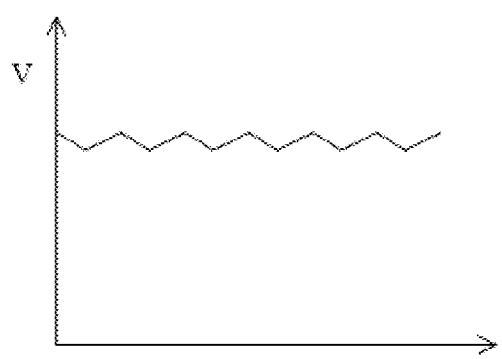

In the complete-short mode, the output voltage of a corresponding photovoltaic cell is kept to be zero, and thereby the output voltage of the entire photovoltaic-cell string is reduced. In the chopping mode, the output voltage of the corresponding photovoltaic cell is changed according to the PWM control, and thereby the output voltage of the entire photovoltaic-cell string becomes a rectangular wave. FIG. 3a is a waveform diagram of the output voltage, in a case that any of three photovoltaic cells included in a photovoltaic-cell string operates in the chopping mode. As shown in FIG. 3B, the rectangular wave may be converted into a saw-tooth wave with a ripple, via a capacitor connected to a post-stage of the photovoltaic cell. Moreover, the photovoltaic modules are connected in series and then output to an inverter side. Due to a phase difference among photovoltaic modules and an input capacitance at the inverter side, an overall output voltage of the photovoltaic string is smoother. Hence, the chopping mode is also capable to reduce the output voltage of the entire photovoltaic-cell string can also be reduced, and a degree of adjustment is more fine. An output of the corresponding photovoltaic cell may be controlled with a certain duty ratio. Preferably, a chopping frequency is higher than a preset frequency, reducing magnitude of the ripple.

It can be seen from the above that a certain degree of short is achieved no matter whether the corresponding photovoltaic cell operates in the complete-short mode or the chopping mode. Thereby, the output voltage of the entire photovoltaic-cell string is reduced. A quantity of photovoltaic modules connected in series can be increased while the highest voltage of the system is guaranteed not to exceed a corresponding requirement. Connections for components are expanded at a direct-current side, and a cost of the system is reduced.

In S103, a photovoltaic cell operating in the voltage-limited mode is controlled to resume a normal output.

After an output of the photovoltaic cell operating in the voltage-limited mode is restored to normal, the output voltage of the entire photovoltaic-cell string can be increased. A rate of utilization on the direct voltage and a PVIR (PV-to-inverter ratio) of DC/AC are effectively improved for the photovoltaic system.

It can be seen from the above that the method for component voltage limitation is provided according to this embodiment. In a case that the direct voltage of the system is higher than the upper limit and needs to be limited before inverter is connected to the grid, the corresponding photovoltaic cell can be controlled to operate in the voltage-limited mode via the instruction for enabling voltage limitation, and the voltage of the photovoltaic-cell string is reduced. Thereby, the quantity of photovoltaic modules connected in series can be increased while the highest voltage of the system is guaranteed not to exceed a corresponding requirement. Connections for components are expanded at the direct-current side, and the cost of the system is reduced. In a case that the direct voltage of the system is lower than the lower limit and needs to be increased after the inverter is connected to the grid, the photovoltaic cell operating in the voltage-limited mode is controlled to resume the normal output via the instruction for suspending voltage limitation, and the output voltage of the photovoltaic-cell string is increased. Thereby, the rate of utilization on the direct voltage and the PVIR of DC/AC are effectively improved for the photovoltaic system.

Optionally, the method for component voltage limitation further includes a following step before the step S101. A parameter of the photovoltaic-cell string is detected and uploaded. Detecting and uploading the corresponding parameter provides a reference for generation of the instruction for enabling voltage limitation or the instruction for suspending voltage-limiting in a subsequent step.

The parameter of the photovoltaic-cell string is a voltage or current of the photovoltaic cell controlled by the method for component voltage limitation. A type of the parameter depends on an application environment and is not specifically limited herein, and all fall within the protection scope of the present disclosure.

Figure 4:
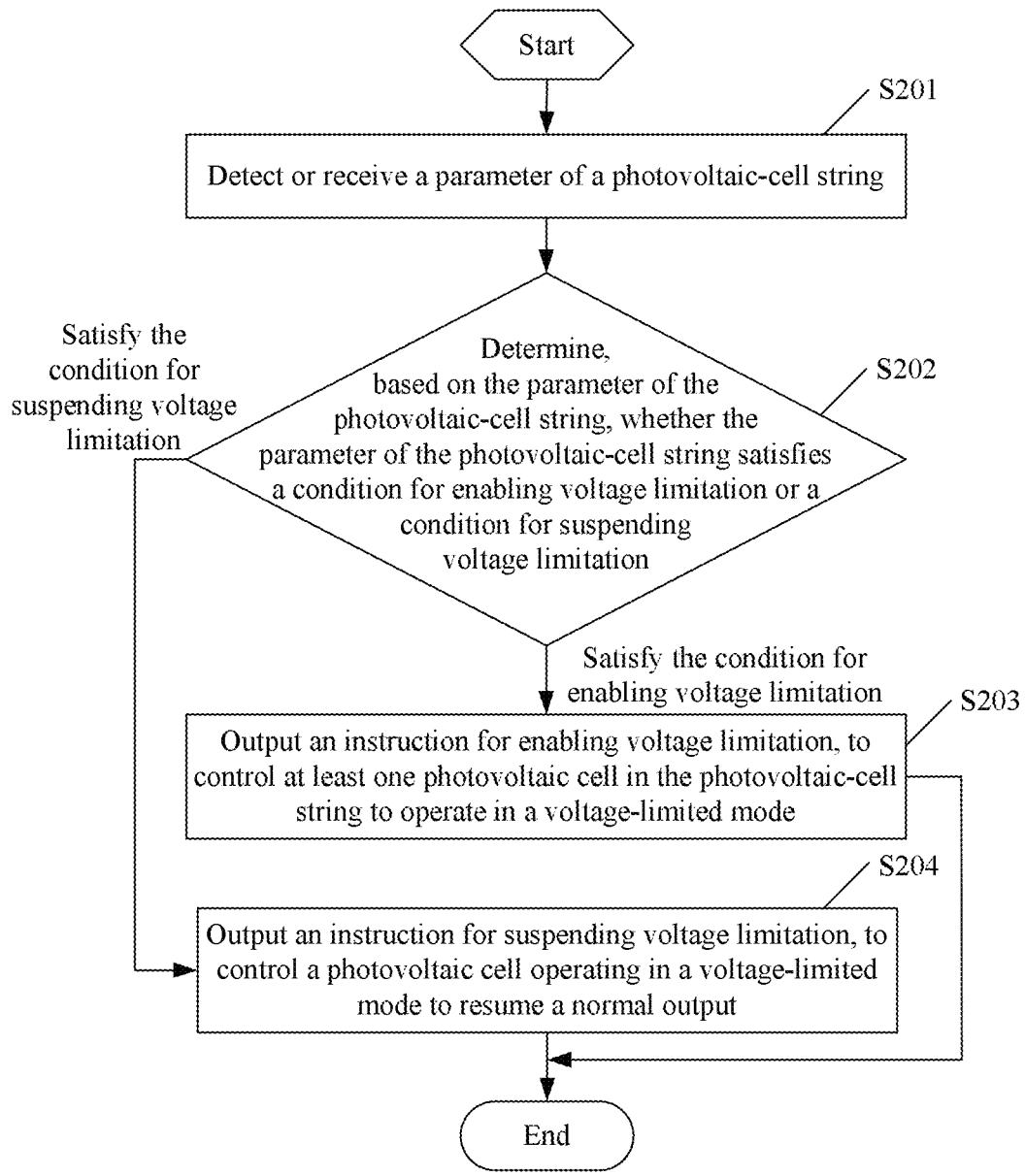
FIG. 4 is a flow chart of another method for component voltage limitation according to an embodiment of the present disclosure.

Another method for component voltage limitation is further provided in a second embodiment of the present disclosure. A specific manner of generating the instruction for enabling voltage limitation and the instruction for suspending voltage limitation is provided based on the foregoing embodiment. As shown in FIG. 4, the method includes steps S201 to S204.

In S201, a parameter of the photovoltaic-cell string is detected or received.

The parameter of the photovoltaic-cell string may be a corresponding parameter acquired by detecting the entire photovoltaic-cell string, or may be a corresponding parameter received from the controlled photovoltaic cell. A type of the parameter depends on an application environment, and all fall within the protection scope of the present disclosure. The parameter may be voltage or current, which fall within the protection scope of the present disclosure as long as a state of the output voltage of the photovoltaic-cell string can be reflected.

In S202, it is determined based on the parameter of the photovoltaic-cell string whether the parameter of the photovoltaic-cell string satisfies a condition for enabling voltage limitation or a condition for suspending voltage limitation.

Specifically, in a case that the parameter of the photovoltaic-cell string characterizes the direct voltage of the system being higher than the upper limit, it indicates that the parameter of the photovoltaic-cell string satisfies the condition for enabling voltage limitation, and the method goes to step S203. In a case that the parameter of the photovoltaic-cell string characterizes the direct voltage of the system being lower than the lower limit, it indicates that the parameter of the photovoltaic-cell string satisfies the condition for suspending voltage limitation, and the method goes to step S204.

In S203, the instruction for enabling voltage limitation is outputted to control at least one photovoltaic cell in the photovoltaic-cell string to operate in a voltage-limited mode.

Specifically, the voltage-limited mode includes a complete-short mode or a chopping mode. In the complete-short mode, an output voltage is zero. In the chopping mode, an output voltage is controlled based on PWM (pulse width modulation).

It can be seen from the above that a certain degree of short is achieved no matter whether the corresponding photovoltaic cell operates in the complete-short mode where the output voltage is zero or the chopping mode where the output voltage is controlled based on PWM. Thereby, the output voltage of the entire photovoltaic-cell string is reduced. A quantity of photovoltaic modules connected in series can be increased, while the highest voltage of the system is guaranteed not to exceed a corresponding requirement. Connections for components are expanded at a direct-current side, and a cost of the system is reduced.

In S204, the instruction for suspending voltage limitation is outputted to control the photovoltaic cell operating in a voltage-limited mode to resume a normal output.

After an output of the photovoltaic cell operating in the voltage-limited mode is restored to normal, the output voltage of the entire photovoltaic-cell string can be increased. A rate of utilization on the direct voltage and a PVIR of DC/AC are effectively improved for the photovoltaic system.

Preferably, the condition for enabling voltage limitation is a condition characterizing that a direct voltage of a system is higher than an upper limit, and the condition for suspending voltage limitation is a condition characterizing that the direct voltage of the system is lower than a lower limit. It can be directly determined based on the output voltage of the entire photovoltaic string, whether the direct voltage of the system is higher than the upper limit or is lower than the lower limit. Alternatively, it can be determined by comparing the output voltage of any photovoltaic module with a preset partial voltage for such photovoltaic module in the photovoltaic string based on a corresponding ratio. Alternatively, it can be indirectly determined based on the current of the photovoltaic-cell string.

It is taken as an example that the detected parameter of the photovoltaic-cell string is the voltage of the photovoltaic-cell string. The condition characterizing that the direct voltage of the system is higher than the upper limit is that the voltage of the photovoltaic-cell string is greater than a first preset voltage. The condition characterizing that the direct voltage of the system is lower than the lower limit is that the voltage of the photovoltaic-cell string is less than a second preset voltage. The first preset voltage is greater than the second preset voltage.

It is taken as an example that the detected parameter of the photovoltaic-cell string is the current of the photovoltaic-cell string. The condition characterizing that the direct voltage of the system is higher than the upper limit value is that the current of the photovoltaic-cell string is less than a first preset current. The condition characterizing that the direct voltage of the system is lower than the lower limit is that the current of the photovoltaic-cell string is greater than a second preset current. The first preset current is less than the second preset current.

Other principles are same as those in the foregoing embodiment, and are not described again herein.

Figure 5:
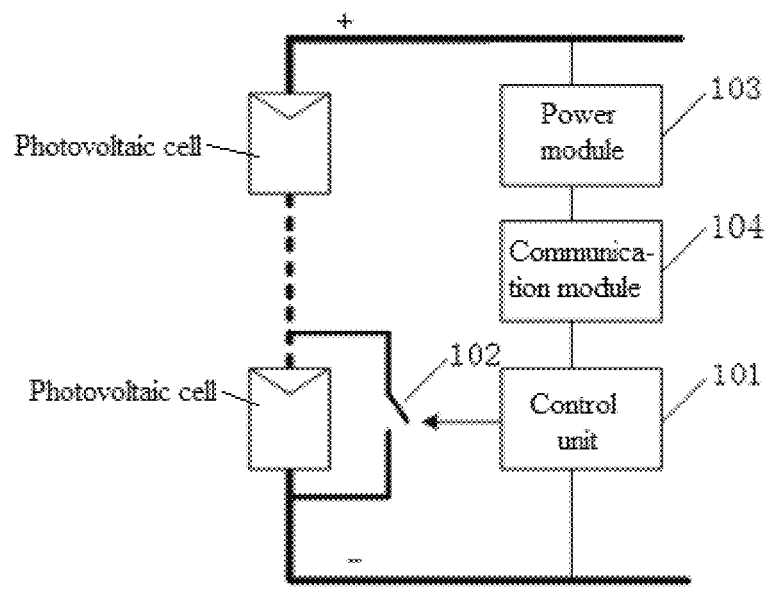
FIGS. 5 to 6E are schematic structural diagrams of six circuits for component voltage limitation according to an embodiment of the present disclosure.

A circuit for component voltage limitation is further provided in another embodiment of the present disclosure. In practice, the circuit for component voltage limitation may be connected between two terminals of multiple photovoltaic-cell sheets, or two terminals of multiple photovoltaic sub-strings, or two terminals of multiple photovoltaic modules. As shown in FIG. 5, the circuit for component voltage limitation includes a control unit 101, a switch unit 102, a power module 103, and a communication module 104.

The control unit 101 is configured to perform the method for component voltage limitation in the first embodiments and shown in FIG. 2. Specifically, the control unit 101 controls the corresponding photovoltaic cell to operate in the voltage-limited mode, to reduce the voltage of the photovoltaic-cell string. Thereby, the quantity of photovoltaic modules connected in series can be increased while the highest voltage of the system is guaranteed not to exceed a corresponding requirement. Connections for components are expanded at the direct-current side, and the cost of the system is reduced. Or, the control unit 101 controls the photovoltaic cell operating in the voltage-limited mode to resume the normal output based on the instruction for suspending voltage limitation, to increase the output voltage of the photovoltaic-cell string. Thereby, the rate of utilization on the direct voltage and the PVIR of DC/AC are effectively improved for the photovoltaic system. A specific process may refer to the first embodiment, and details are not described again herein.

The communication module 104 is for communication between the control unit 101 and outside. The communication module 104 is mainly configured receive and forward the instruction for enabling voltage limitation or the instruction for suspending voltage limitation, which is inputted from outside to the control unit 101. The communication module 104 is further configured to upload the detected parameter of the photovoltaic-cell string to a corresponding external controller, in a case that the method performed by the control unit 101 includes detecting the parameter of the photovoltaic-cell string.

The switching unit 102 is connected in parallel with a photovoltaic cell controlled by the control unit 101. The switch unit 102 is controlled by the control unit 101, to make the respective photovoltaic cell to operate in the voltage-limited mode or to resume the normal output.

Figure 6A:
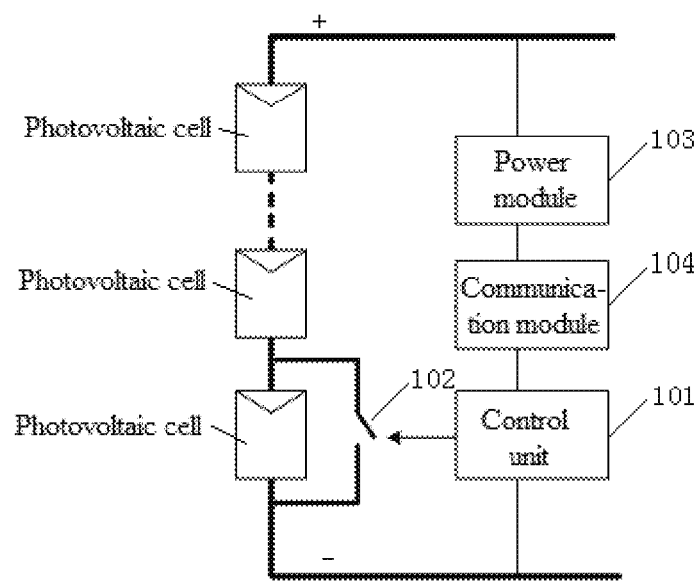
Figure 6B:
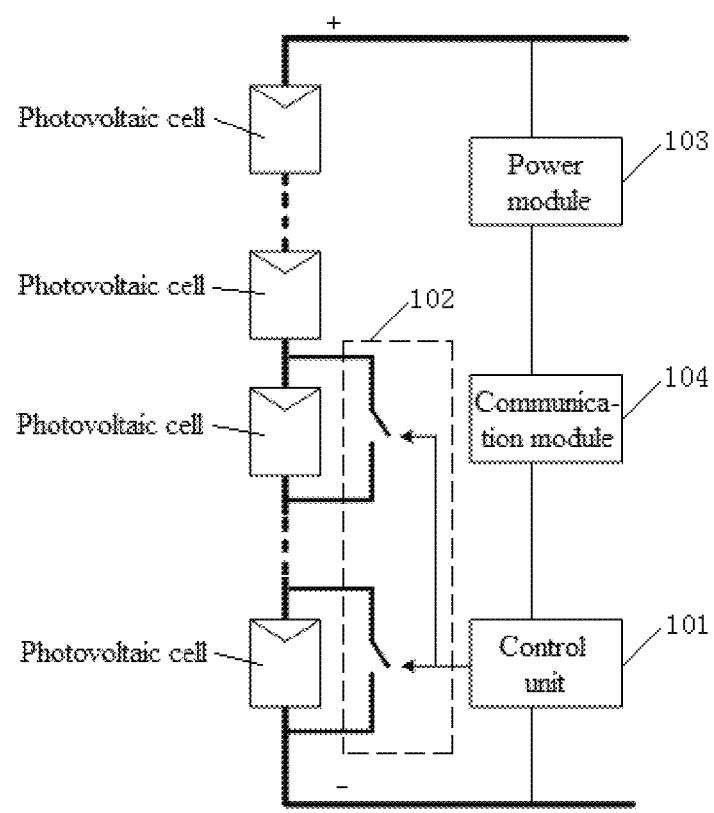
Figure 6C:
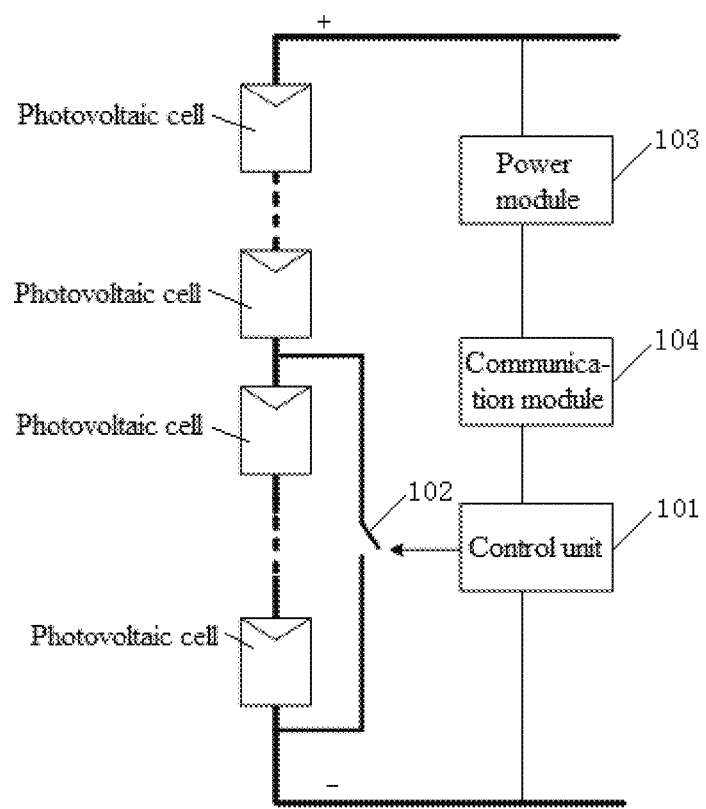
Figure 6D:
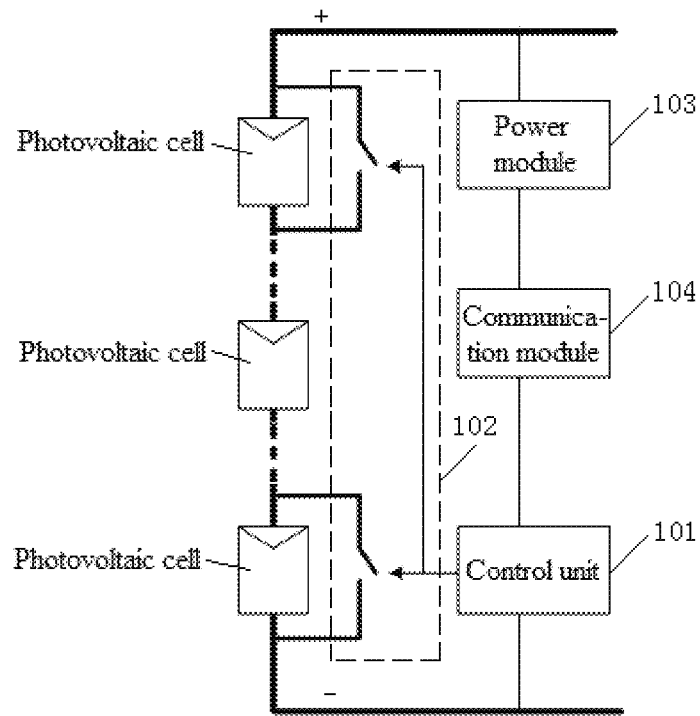
Figure 6E:
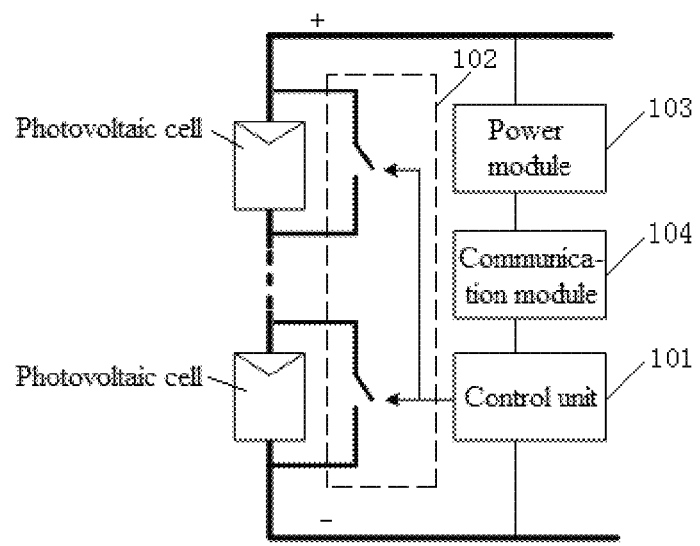

The switch unit 102 may be implemented in various manners. For example, in a case that the photovoltaic cell controlled by the control unit 101 is a photovoltaic cell in the photovoltaic-cell string, the switch unit 102 is a switch connected in parallel with the photovoltaic cell, as shown in FIG. 6A. In a case that the photovoltaic cell controlled by the control unit 101 is photovoltaic cells connected in series as a part of the photovoltaic-cell string, the switch unit 102 may be multiple switches connected in parallel with the photovoltaic cells in a one-to-one correspondence, as shown in FIG. 6B, or may be a switch connected in parallel with all corresponding photovoltaic cells, as shown in FIG. 6C. In a case that the photovoltaic cell controlled by the control unit 101 is multiple photovoltaic cells which are not connected in the photovoltaic-cell string, the switch unit 102 includes multiple switches connected in parallel with the photovoltaic cells in a one-to-one correspondence, as shown in FIG. 6D. In a case that the photovoltaic cell controlled by the control unit 101 are all photovoltaic cells in the photovoltaic-cell string, the switch unit 102 includes multiple switches connected in parallel with all the photovoltaic cells in a one-to-one correspondence, as shown in FIG. 6E. The aforementioned cases may be combined with each other. The combinations are not further described herein, and all fall within the protection scope of the present disclosure.

In practice, the switch is preferably a controllable electronic switch, such as MOSFET (metal-oxide-semiconductor field-effect transistor), IGBT (insulated gate bipolar transistor), a triode, a relay, or the like. A type of the switch depends on an application environment, and all fall within the protection scope.

The power module 103 is configured to power the control unit 101 and the communication module 104.

In practice, the power module 103 may obtain power from the photovoltaic-cell string (as shown in FIG. 5, FIG. 6A to FIG. 6E), from a part of the photovoltaic-cell string (not shown in figures), or from outside (not shown in figures). A manner of obtaining power depends on an application environment and is not specifically limited herein, and all fall within the protection scope of the present disclosure.

A circuit of the power module 103 may be implemented as a conventional LDO (low dropout regulator), a half bridge circuit, or a flyback circuit. A type of the circuit depends on an application environment and is not specifically limited herein, and all fall within the protection scope of the present disclosure.

A specific process of performing the method for component voltage limitation may refer to the foregoing embodiments, and is not described again herein.

Figure 7A:
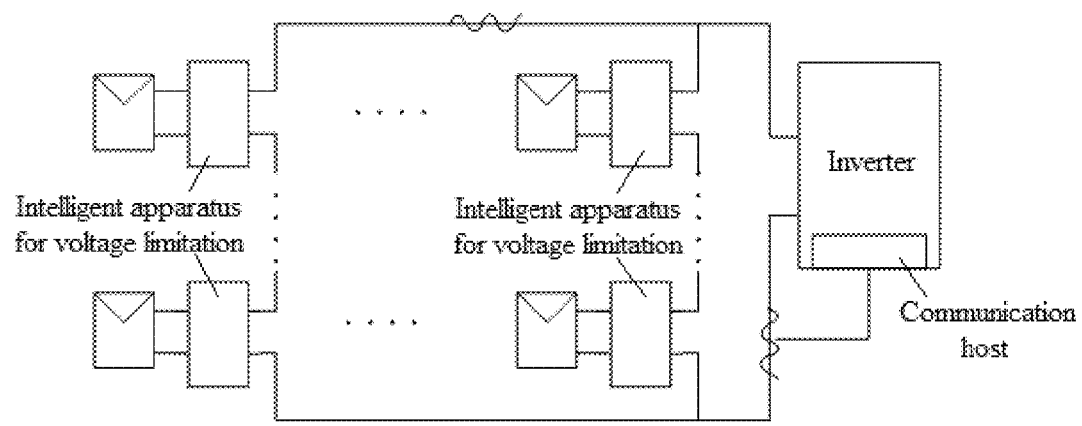
FIGS. 7A and 7B are schematic structural diagrams of two photovoltaic power generation systems including an independent intelligent apparatus for voltage limitation according to an embodiment of the present disclosure.
Figure 7B:
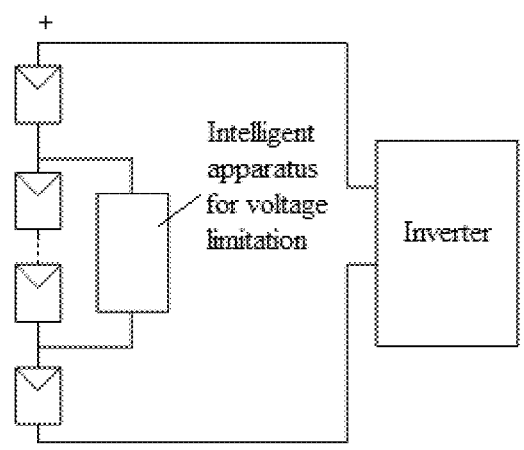

An intelligent apparatus for voltage limitation is further provided in another embodiment of the present disclosure. The intelligent apparatus is applied to the photovoltaic power generation system as shown in FIG. 7A and FIG. 7b. A photovoltaic string of the photovoltaic power generation system includes multiple conventional photovoltaic modules connected in series. In the photovoltaic string, a part of the photovoltaic modules may be provided with the intelligent apparatus for voltage limitations. For example, the photovoltaic modules are connected in parallel with the intelligent apparatuses for voltage limitation in a one-to-one correspondence (not shown in figures). Alternatively, the multiple photovoltaic modules connected in series as a whole are connected in parallel with an intelligent apparatus for voltage limitation (as shown in FIG. 7B). Alternatively, each photovoltaic module may be provided with a corresponding intelligent apparatus for voltage limitation connected in parallel with said photovoltaic module (as shown in FIG. 7A). Preferably, the intelligent apparatuses for voltage limitation arranged in each photovoltaic string are identical in quantity and in connection. Thereby, the output voltage of each photovoltaic string is kept same in a simple manner. It is appreciated that in practice, the quantity and the connection of the intelligent apparatuses for voltage limitation may also be independently set for each photovoltaic string, and the intelligent apparatuses for voltage limitation may be flexibly selected on requirement for voltage-limiting control, which is not limited herein.

The intelligent apparatus for voltage limitation includes the circuit for component voltage limitation according to any aforementioned embodiment, and reference may be made to the aforementioned embodiment for a specific structure and a principle. The photovoltaic power generation systems shown in FIG. 7A and FIG. 7b are taken as an example. It is required that a voltage (the direct voltage of the system) inputted to the direct-current side of the inverter does not exceed 1500V. Voltages of the photovoltaic modules may gradually increase with a change in illumination and the inverter may detect that the direct voltage of the system is greater than 1450V, for example, before the inverter is connected to the grid. Therefore in such case, the intelligent apparatus for voltage limitation limits the output voltage of the photovoltaic module connected thereto based on the instruction for enabling voltage limitation, so that the total output of the photovoltaic string does not exceed 1500V. After the inverter is connected to the grid, the bus voltage at the direct-current side of the inverter is reduced to about 1200V due to slow stabilization in MPPT. In such case, the intelligent apparatus for voltage limitation suspends the voltage-limiting function based on the instruction for suspending voltage limitation, and the output voltage is restored, with an overall voltage still lower than 1500V.

As a result, a higher capacity of the photovoltaic modules connected in series may be connected to the direct side of the inverter for 1500V. For example, the capacity may be up to 1800V. The voltage is still effectively controlled within 1500V by the intelligent apparatus for voltage limitation. A cost is reduced. After grid-connection, a voltage of the system can be increased up to 1500V from 1200V in conventional technology. Hence, a PVIR of the system is improved.

Figure 8:
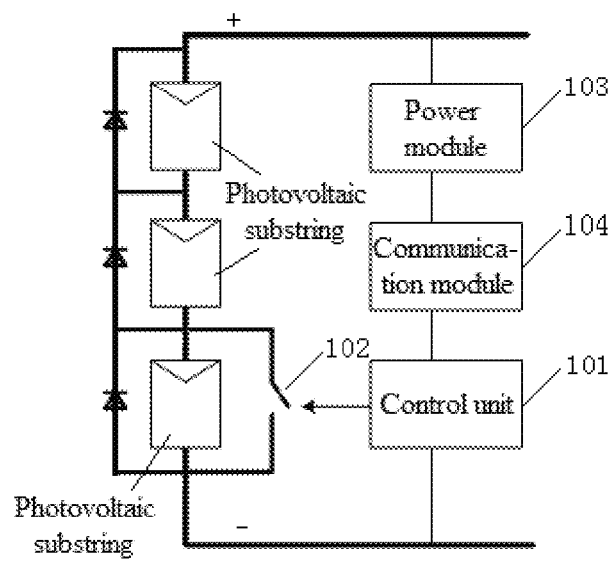
FIG. 8 is a schematic structural diagram of an intelligent junction box for voltage limitation according to an embodiment of the present disclosure.

An intelligent junction box for voltage limitation is further provided according to another embodiment of the present disclosure. As shown in FIG. 8, the intelligent junction box including: multiple diodes, and the circuit for component voltage limitation according to any aforementioned embodiment. The photovoltaic cell connected to the circuit for component voltage limitation is a photovoltaic sub-string, and each diode is connected in anti-parallel with the corresponding photovoltaic sub-string.

The power module 103 of the intelligent junction box for voltage limitation obtains power from the entire photovoltaic component and supplies power to the control unit 101 and the communication module 104. The switch unit 102 is a controllable electronic switch, such as a MOSFET, an IGBT, a triode, a relay, or the like. FIG. 8 shows an example in which the controllable electronic switch is connected in parallel with one of the photovoltaic sub-strings.

A highest open circuit voltage is about 42 V in winter for a conventional photovoltaic module, which includes 60 photovoltaic-cell sheets and three photovoltaic sub-strings. A voltage of each photovoltaic sub-string is 14V. A photovoltaic module with including 72 photovoltaic-cell sheets is similar.

In a case that a voltage of the photovoltaic module is high, for example, exceeds Uth1=36V, the control unit 101 receives the instruction for enabling voltage limitation via the communication module 104, and thereby actively controls the switch to enter the voltage-limited mode. Theoretically, the voltage can be reduced by ⅓, namely, to 24V. Specifically, in a case that the switch is normally-on in voltage limitation control of the corresponding photovoltaic sub-string, the output voltage of the photovoltaic module is changed to ⅔V. In a case the switch is controlled based on PWM in voltage limitation control of the corresponding photovoltaic sub-string, the output voltage of the photovoltaic module is changed into a saw-tooth wave with magnitude about ⅔V (see FIG. 3A and FIG. 3b). V refers to the voltage of the module before limiting the output voltage of the corresponding photovoltaic sub-string. As the voltage keeps increasing toward 42V, an actual voltage at ports would not exceed 28V. As a whole, the maximum output of the entire photovoltaic module is limited below Uth1=36V when the circuit for component voltage limitation is provided in the intelligent junction box for voltage limitation.

In a case that the voltage of the photovoltaic module is low, for example, lower than Uth2=20V, the control unit 101 receives the instruction for suspending voltage limitation via the communication module 104, and thereby recovers the output voltage of the photovoltaic sub-string from being limited. Theoretically, and the voltage may be recovered to 30V.

It can be known from the above that a maximum quantity of modules that can be connected to a 1500V photovoltaic power generation system is increased from original 1500V/42V=35 to 1500V/36V=41, by using the intelligent junction box for voltage limitation. A capacity of the photovoltaic system is further expanded, and fewer cables are used for a same quantity of inverters. A cost is reduced, and a rate of utilization is improved for the inverter.

Further, granularity of the adjustment is smaller in a case that the switching unit 102 is provided for ⅙ of the photovoltaic sub-string. An effect of the adjustment is better.

Rest of the structure and principles are same as those in the foregoing embodiment, and are not described again herein.

An intelligent component is further provided according to another embodiment of the present disclosure. The intelligent component includes a photovoltaic module, and the intelligent junction box for voltage limitation according to any aforementioned embodiment.

Figure 9:
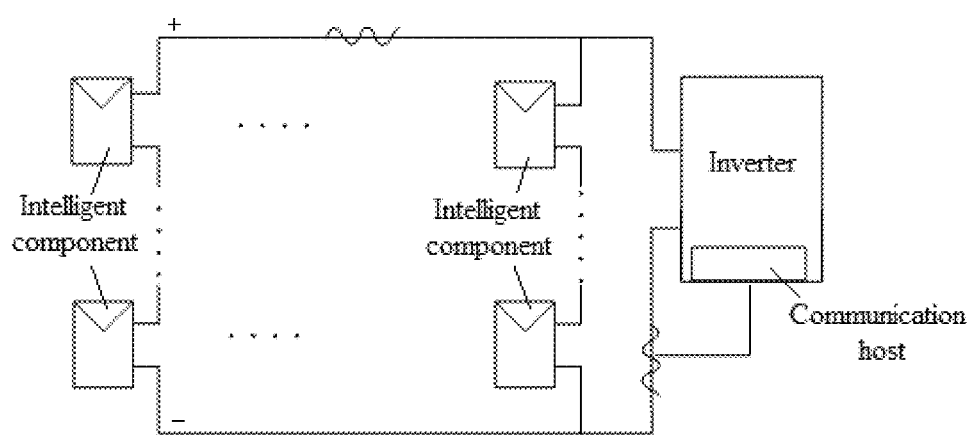
FIG. 9 is a schematic structural diagram of a photovoltaic power generation system including an intelligent component according to an embodiment of the present disclosure.

Multiple intelligent components are connected in series and parallel, and then connected to the direct-current side of the inverter. A system structure thereof is as shown in FIG. 9. An initial direct voltage for the system is 1800V. Before the inverter is connected to the grid, a part of outputs within the intelligent component are limited in a case that the intelligent component intelligently activate the voltage-limiting function based on the instruction for enabling voltage limitation. Thereby, it is ensured that the direct voltage of the whole system does not exceed 1500V. After the inverter is connected to the grid, the direct voltage of the system is pulled to about 1200V due to slow stabilization of MPPT. Then, the intelligent component suspends the voltage-limiting function based on the instruction for suspending voltage limitation. Thereby, the system generates power normally, with an overall voltage still lower than 1500V.

A structure and a principle of the intelligent junction box for voltage limitation are same as those of the foregoing embodiment, and are not described again herein.

A controller is further provided according to another embodiment of the present disclosure. The controller includes a processor and a memory. The processor is configured to execute a program stored in the memory. The program stored in the memory includes the method for component voltage limitation according to the second embodiment and shown in FIG. 4.

It is taken as an example that the photovoltaic cell is the photovoltaic sub-string. A highest open circuit voltage is about 42 V in winter for a conventional photovoltaic module, which includes 60 photovoltaic-cell sheets and three photovoltaic sub-strings. A voltage of each photovoltaic sub-string is 14V. A photovoltaic module with including 72 photovoltaic-cell sheets is similar.

A received voltage of the photovoltaic sub-string may serve as a parameter for determination. In a case that the voltage of the photovoltaic module is high, for example, exceeds Uth1=36V, the controller outputs the instruction for enabling voltage limitation, and thereby the voltage of the photovoltaic module is reduced by ⅓, namely, to 24V. In a case that the voltage of the photovoltaic module is low, for example, lower than Uth2=20V, the controller outputs the instruction for suspending voltage limitation, and thereby the photovoltaic sub-string is recovered from the limited output voltage. In such case, the voltage may be recovered to 30V theoretically.

Figure 10:
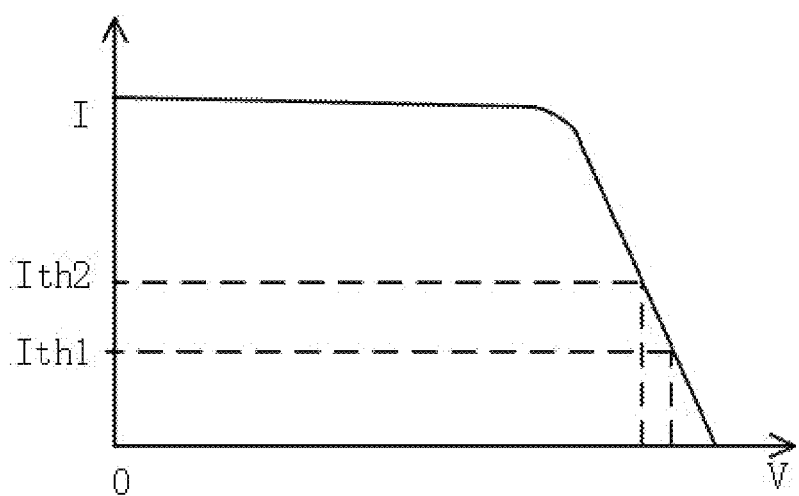
FIG. 10 is a schematic graph of a photovoltaic curve according to an embodiment of the present disclosure.

Alternatively, a received current of the photovoltaic sub-string may serve as a parameter for determination. In a case that the photovoltaic module is in open circuit, there is no load current, and the voltage is high. In case of being connected to a load, the voltage is pulled down according to a photovoltaic curve (as shown in FIG. 10), forming a load current. It is assumed that the controller outputs the instruction for enabling voltage limitation to ensure a low output voltage in a case that current is lower than Ith1 (such as 2A). In a case that the current is higher than Ith2 (such as 3A), it is considered that the inverter is operating and pulling down a bus voltage. Therefore, the controller outputs the instruction for suspending voltage limitation to restore power generation of the photovoltaic-cell sheets. A same effect is achieved.

Other principles of the method for component voltage limitation may refer to the second embodiment, and details are not described again herein.

An inverter is further provided according to another embodiment of the present disclosure. A program executed by a controller of the inverter includes the method for component voltage limitation according to the second embodiment and shown in FIG. 4.

Other principles of the method for component voltage limitation may refer to the second embodiment and the foregoing embodiment, and details are not described again herein.

Preferably, the inverter further includes a communication host configured to communicate with outside. For example, the communication host is configured to issue the instruction for enabling voltage limitation or the instruction for suspending voltage limitation outputted by the controller. Further, the communication host is capable to receive a parameter of the photovoltaic-cell string, in a case that the inverter receives the parameter uploaded by a corresponding apparatus (such as the circuit for component voltage limitation). The communication host may be in wire communication or wireless communication with the corresponding apparatus. FIG. 7A and FIG. 9 shows a manner of power line carrier communication. In practice, a communication manner may be selected according to a specific environment and is not limited herein, and all fall within the protection scope of the present disclosure.

A photovoltaic power generation system is further provided according to another embodiment of the present disclosure. As shown in FIG. 7A and FIG. 7B, the system includes an inverter, at least one photovoltaic string, and a communication host.

The inverter is as described in the foregoing embodiment.

The at least one photovoltaic string is connected to a direct-current side of the inverter. The at least one photovoltaic string includes multiple photovoltaic modules connected in series. Each photovoltaic string is connected with at least one intelligent apparatus for voltage limitation.

The communication host is configured to communicate with the at least one intelligent apparatus for voltage limitation. For example, the communication host is configured to issue the instruction for enabling voltage limitation or the instruction for suspending voltage limitation, which is outputted from the inverter to the intelligent apparatus for voltage limitation. Or, the communication host is configured to receive the parameter of the photovoltaic-cell string uploaded by the intelligent apparatus for voltage limitation. The communication host may be in wire communication or wireless communication with the intelligent apparatus for voltage limitation. A communication manner is not limited herein and depends on an application environment, and all falls within the protection scope of the present disclosure.

A specific structure and an operation principle of the inverter and the intelligent apparatus for voltage limitation may refer to the foregoing embodiments, and details are not described again herein.

Optionally, the communication host may be independent from the inverter or integrated inside the inverter. A location depends on an application environment, and all fall within the protection scope of the present disclosure.

A photovoltaic power generation system is further provided according to another embodiment of the present disclosure. As shown in FIG. 9, the system includes an inverter, at least one photovoltaic string connected to a direct-current side of the inverter, and a communication host.

The photovoltaic string includes multiple intelligent components connected in series.

Each intelligent component is the intelligent component described in the foregoing embodiment.

The communication host is configured to communicate with the intelligent apparatus for voltage limitation. For example, the communication host is configured to issue the instruction for enabling voltage limitation or the instruction for suspending voltage limitation, which is outputted from the inverter to the intelligent component. Or, the communication host is configured to receive the parameter of the photovoltaic-cell string uploaded by the intelligent component. The communication host may be in wire communication or wireless communication with the intelligent component. A communication manner is not limited herein and depends on an application environment, and all falls within the protection scope of the present disclosure.

A specific structure and an operation principle of the inverter and the intelligent apparatus for voltage limitation may refer to the foregoing embodiments, and details are not described again herein.

Optionally, the communication host may be independent from the inverter or integrated inside the inverter. A location depends on an application environment, and all fall within the protection scope of the present disclosure.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for component voltage limitation, applied in a photovoltaic power generation system comprising an inverter, comprising:
   receiving an instruction for enabling voltage limitation or an instruction for suspending voltage limitation, wherein the instruction for enabling voltage limitation is received before the inverter is connected to a grid, and the instruction for suspending voltage limitation is received after the inverter is connected to the grid;
   controlling at least one photovoltaic cell in a photovoltaic-cell string to operate in a voltage-limited mode, in response to receiving the instruction for enabling voltage limitation, wherein the photovoltaic-cell string comprises a plurality of photovoltaic cells connected in series, and each of the plurality of photovoltaic cells is a photovoltaic-cell sheet, or a photovoltaic sub-string; and
   controlling a photovoltaic cell operating in the voltage-limited mode to resume a normal output, in response to receiving the instruction for suspending voltage limitation;
   wherein the voltage-limited mode includes a chopping mode, and in the chopping mode, an output voltage of the at least one photovoltaic cell in the photovoltaic-cell string is controlled based on pulse width modulation (PWM) to ensure that an output of a corresponding photovoltaic cell is controlled with a certain duty ratio.

2. The method according to claim 1, wherein before receiving the instruction for enabling voltage limitation or the instruction for suspending voltage limitation, the method further comprises:
    detecting and uploading a parameter of the photovoltaic-cell string, wherein the parameter of the photovoltaic-cell string is a voltage or a current of a controlled photovoltaic cell.

3. A method for component voltage limitation, applied in a photovoltaic power generation system comprising an inverter, comprising:
    detecting or receiving a parameter of a photovoltaic-cell string, wherein the photovoltaic-cell string comprises a plurality of photovoltaic cells connected in series, and each of the plurality of photovoltaic cells is a photovoltaic-cell sheet, or a photovoltaic sub-string;
    determining, based on the parameter of the photovoltaic-cell string, whether the parameter of the photovoltaic-cell string satisfies a condition for enabling voltage limitation or a condition for suspending voltage limitation;
    outputting an instruction for enabling voltage limitation before the inverter is connected to a grid, to control at least one photovoltaic cell in the photovoltaic-cell string to operate in a voltage-limited mode, in response to the parameter of the photovoltaic-cell string satisfying the condition for enabling voltage limitation; and
    outputting the instruction for suspending voltage limitation after the inverter is connected to the grid, to control a photovoltaic cell operating in the voltage-limited mode to resume a normal output, in response to the parameter of the photovoltaic-cell string satisfying the condition for suspending voltage limitation;
    wherein the voltage-limited mode includes a chopping mode, and in the chopping mode, an output voltage of the at least one photovoltaic cell in the photovoltaic-cell string is controlled based on pulse width modulation (PWM) to ensure that an output of a corresponding photovoltaic cell is controlled with a certain duty ratio.

4. The method according to claim 3, wherein:
    the detected parameter of the photovoltaic-cell string is a voltage or a current of the photovoltaic-cell string; or
    the received parameter of the photovoltaic-cell string is a voltage or a current of a controlled photovoltaic cell.

5. The method according to claim 4, wherein:
    the condition for enabling voltage limitation is a condition characterizing that a direct voltage of a system is higher than an upper limit; and
    the condition for suspending voltage limitation is a condition characterizing that the direct voltage of the system is lower than a lower limit.

6. The method according to claim 5, wherein:
    the detected parameter of the photovoltaic-cell string is the current of the photovoltaic-cell string;
    the condition characterizing that the direct voltage of the system is higher than the upper limit value is that the current of the photovoltaic-cell string is less than a first preset current;
    the condition characterizing that the direct voltage of the system is lower than the lower limit is that the current of the photovoltaic-cell string is greater than a second preset current; and
    the first preset current is less than the second preset current.

7. The method according to claim 5, wherein:
    the detected parameter of the photovoltaic-cell string is the voltage of the photovoltaic-cell string,
    the condition characterizing that the direct voltage of the system is higher than the upper limit is that the voltage of the photovoltaic-cell string is greater than a first preset voltage,
    the condition characterizing that the direct voltage of the system is lower than the lower limit is that the voltage of the photovoltaic-cell string is less than a second preset voltage,
    and the first preset voltage is greater than the second preset voltage.

8. A circuit for component voltage limitation, comprising:
    a communication module, a control unit, a switch unit, and a power module, wherein:
    the control unit is configured to perform the method for component voltage limitation according to claim 1;
    the communication module is for communication between the control unit and an external device of the circuit for component voltage limitation;
    the switch unit is connected in parallel with a photovoltaic cell controlled by the control unit, and the switch unit is controlled by the control unit, to make the photovoltaic cell operate in the voltage-limited mode or resume the normal output; and
    the power module is configured to power the communication module and the control unit.

9. An intelligent apparatus for voltage limitation, comprising:
    the circuit for component voltage limitation according to claim 8,
    wherein the photovoltaic cell connected to the circuit for component voltage limitation is a photovoltaic module.

10. An intelligent junction box for voltage limitation, comprising:
    a plurality of diodes, and
    the circuit for component voltage limitation according to claim 8;
    wherein the photovoltaic cell connected to the circuit for component voltage limitation is a photovoltaic sub-string; and
    wherein each of the plurality of diodes is connected in anti-parallel with a corresponding one of the photovoltaic sub-string.

11. An intelligent component, comprising:
    a photovoltaic module, and
    the intelligent junction box for voltage limitation according to claim 10.

12. A controller, comprising:
    a processor and a memory, wherein:
    the processor is configured to execute a program stored in the memory; and
    the program stored in the memory comprises the method for component voltage limitation according to claim 3.

13. An inverter, wherein:
    a program executed by a controller of the inverter comprises the method for component voltage limitation according to claim 3.

14. The inverter according to claim 13, further comprising:
    a communication host, configured to communicate with an external device of the inverter.

15. A photovoltaic power generation system, comprising:
    an inverter, wherein a program executed by a controller of the inverter comprises:
        detecting or receiving a parameter of a photovoltaic-cell string, wherein the photovoltaic-cell string comprises a plurality of photovoltaic cells connected in series, and each of the plurality of photovoltaic cells is a photovoltaic-cell sheet, or a photovoltaic substring;

determining, based on the parameter of the photovoltaic-cell string, whether the parameter of the photovoltaic-cell string satisfies a condition for enabling voltage limitation or a condition for suspending voltage limitation;

outputting an instruction for enabling voltage limitation before the inverter is connected to a grid, to control at least one photovoltaic cell in the photovoltaic-cell string to operate in a voltage-limited mode, in response to the parameter of the photovoltaic-cell string satisfying the condition for enabling voltage limitation, wherein the voltage-limited mode includes a chopping mode, and in the chopping mode, an output voltage of the at least one photovoltaic cell in the photovoltaic-cell string is controlled based on pulse width modulation (PWM) to ensure that an output of a corresponding photovoltaic cell is controlled with a certain duty ratio; and outputting the instruction for suspending voltage limitation after the inverter is connected to the grid, to control a photovoltaic cell operating in the voltage-limited mode to resume a normal output, in response to the parameter of the photovoltaic-cell string satisfying the condition for suspending voltage limitation;

at least one photovoltaic string connected to a direct-current side of the inverter, wherein the at least one photovoltaic string comprises a plurality of photovoltaic modules connected in series, and each of the at least one photovoltaic string is connected with at least one intelligent apparatus for voltage limitation according to claim 9; and a communication host, configured to communicate with the at least one intelligent apparatus for voltage limitation.

16. The photovoltaic power generation system according to claim 15, wherein the communication host is integrated inside the inverter.

17. A photovoltaic power generation system, comprising:
an inverter, wherein a program executed by a controller of the inverter comprises:

detecting or receiving a parameter of a photovoltaic-cell string, wherein the photovoltaic-cell string comprises a plurality of photovoltaic cells connected in series, and each of the plurality of photovoltaic cells is a photovoltaic-cell sheet, or a photovoltaic substring;

determining, based on the parameter of the photovoltaic-cell string, whether the parameter of the photovoltaic-cell string satisfies a condition for enabling voltage limitation or a condition for suspending voltage limitation;

outputting an instruction for enabling voltage limitation before the inverter is connected to a grid, to control at least one photovoltaic cell in the photovoltaic-cell string to operate in a voltage-limited mode, in response to the parameter of the photovoltaic-cell string satisfying the condition for enabling voltage limitation wherein the voltage-limited mode includes a chopping mode, and in the chopping mode, an output voltage of the at least one photovoltaic cell in the photovoltaic-cell string is controlled based on pulse width modulation (PWM) to ensure that an output of a corresponding photovoltaic cell is controlled with a certain duty ratio; and outputting the instruction for suspending voltage limitation after the inverter is connected to the grid, to control a photovoltaic cell operating in the voltage-limited mode to resume a normal output, in response to the parameter of the photovoltaic-cell string satisfying the condition for suspending voltage limitation;

at least one photovoltaic string connected to a direct-current side of the inverter, wherein the at least one photovoltaic string comprises a plurality of intelligent components connected in series, and each of the plurality of intelligent components is the intelligent component according to claim 11; and a communication host, configured to communicate with the plurality of components.

18. The photovoltaic power generation system according to claim 17, wherein the communication host is integrated inside the inverter.

* * * * *